United States Patent Office 2,852,569
Patented Sept. 16, 1958

2,852,569

PREPARATION OF PERFLUOROALDEHYDES AND ALDEHYDROLS

Milton Braid, Philadelphia, and Francis Earl Lawlor, Wyndmoor, Pa., assignors to Pennsalt Chemicals Corporation, a corporation of Pennsylvania No Drawing. Application June 3, 1954
Serial No. 434,333

6 Claims. (Cl. 260—633)

This invention relates to a novel method for the preparation of perfluoroaldehydrols, which may be dehydrated in accordance with known procedures to produce perfluoroaldehydes.

Previous methods for preparing trifluoroacetaldehyde include reduction of trifluoroacetonitrile with lithium aluminum hydride followed by hydrolysis and dehydration, oxidative nitration of 1,1,1-trifluoropropane, reduction of trifluoroacetyl chloride with hydrogen and a catalyst, and reduction of trifluoroacetic acid with lithium aluminum hydride followed by hydrolysis and dehydration. All of these procedures involve the laborious preparation of intermediates and/or catalysts, with the exception of the last-named method. Poor overall yields of the desired trifluoroacetaldehyde are obtained, and in the last-named method the yield is about 25 percent.

In the prior art method for the reduction of perfluorocarboxylic acids with lithium aluminum hydride, powdered lithium aluminum hydride is dissolved in a large volume of diethyl ether, and to this solution is added, dropwise, a solution of a perfluorocarboxylic acid in a diethyl ether solvent, while the reaction mixture is kept cool in an ice bath. The addition is made at a rate which will produce a gentle reflux of the ether. The complex formed between the lithium aluminum hydride and the acid is then hydrolyzed to form the corresponding aldehydrol from which the aldehyde may be recovered by dehydration, using a suitable drying agent.

In accordance with the present invention, it has been found that the reverse order of addition of lithium aluminum hydride in a solvent to relatively concentrated solutions of perfluorocarboxylic acids in suitable solvents provides a convenient method for preparing perfluoroaldehydrols in substantially higher yields than have been obtained using the processes of the prior art. Only a small quantity of 1,1-dihydroperfluoroalcohol is obtained, and the corresponding perfluoroaldehydes may be obtained by dehydration of the perfluoroaldehydrols with a suitable drying agent. Only the stoichiometric amount of lithium aluminum hydride necessary for reduction of the acid to the aldehydrol is required in this procedure. Contrasted to this, normal additions of perfluorocarboxylic acids to this smaller quantity of hydride gave even lower yields than those observed in duplicating the process of the prior art.

Generally speaking, the process of the invention comprises slowly adding a solution of lithium aluminum hydride in a suitable solvent to a perfluorocarboxylic acid, containing about 2–18 carbon atoms, to form an intermediate or complex between the lithium aluminum hydride and the perfluorocarboxylic acid, which is then hydrolyzed to the desired perfluoroaldehydrol by the addition of water.

About 0.25 to 1.0 mole of lithium aluminum hydride may be slowly added to 1.0 mole of a perfluorocarboxylic acid preferably dissolved in about one liter of solvent, maintained at a temperature of about −10 to +5° C., with the preferred temperature being in the range of about −5 to 0° C. The addition is accomplished with constant agitation and may be performed over a period of about 1–2 hours or more. When the hydride addition is completed, the reaction mixture is agitated at a temperature of about 0–5° C. for about one hour and then hydrolyzed with water and a suitable acid, maintaining the temperature of the mixture in the range of about 0–10° C. Alternatively, the complex may be hydrolyzed immediately, but agitating for an additional period of time is preferred.

The aldehydrol is soluble in the solvent and is obtained, after hydrolysis, from the combined solvent layer and extracts upon removal of the solvent. Dehydration of the aldehydrol with a suitable dehydrating agent yields the free aldehyde.

Among the solvents which may be employed in the process are diethyl ether, di-tertiary-butyl ether, tetrahydrofuran, and tetrahydropyran. Generally, any solvent may be employed which is non-reactive with lithium aluminum hydride and in which lithium aluminum hydride is soluble at the temperature of reaction, this solubility being a controlling factor in the selection of a proper solvent. Diethyl ether is the preferred solvent, due to the solubility of lithium aluminum hydride therein and the fluidity thereof at the reaction temperature.

The aldehydrol may be dehydrated using a drying agent such as sulfuric acid, phosphorus pentoxide, or a mixture of phosphorus pentoxide and sulfuric acid, or other suitable dehydrating agent.

The following table illustrates the advantage obtained in adding the lithium aluminum hydride to the perfluorocarboxylic acid rather than adding the acid to the anhydride in accordance with the practice of the prior art. It will be seen that the quantity of lithium aluminum hydride, the volume of ether solution added to the reaction mixture, the reaction time and the total volume of the reaction mixture are all decreased, while the yield of the aldehyde product is greatly increased, with nearly three times as much product being obtained when the method of the invention is employed.

TABLE 1

| Method | Moles CF$_3$COOH | Moles LiAlH$_4$ | Vol. Ether Soln. Added, ml. | Addition Time, hrs. | Total Vol., ml. | Aldehyde Yield, percent |
|---|---|---|---|---|---|---|
| Acid to Hydride [1] | 1 | 1 | ca. 2,100 | 6 | 4,600 | 26 |
| Hydride to Acid | 1 | 0.57 | 750 | 1.5 | 1,750 | 77.5 |

[1] Tabular values adjusted for 1 mole run.

The invention will be further illustrated by reference to the following specific examples in which all parts are by weight:

*Example 1*

114 parts (1 mole) of trifluoroacetic acid were dissolved in 708 parts of anhydrous diethyl ether and placed in a 3 liter flask equipped with a dropping funnel, a nitrogen inlet, an agitator, a thermometer and a condenser protected by a soda-lime tube, followed by a mercury bubbler. The apparatus was flushed with nitrogen gas and cooled to a temperature of −5° C. with an ice-salt mixture. 21.5 parts of lithium aluminum hydride (0.565 mole) dissolved in 525 parts of anhydrous diethyl ether were added to the flask, dropwise, over a period of 1 hour and 20 minutes, the temperature of the reaction mixture being maintained in the range of 0–3° C. during the addition. Gas was evolved during the entire course of the addition, but ceased when the addition was completed. After completion of the addition, the reaction mixture was agitated at a temperature of 0° C. for 1 hour.

40 parts of water were then added to the flask over a period of 20 minutes, while passing nitrogen gas continuously through the flask and maintaining the temperature of the reaction mixture in the range of 0–5° C. and a mixture of 114.7 parts of concentrated sulfuric acid in 200 parts of water was then added over a period of 40 minutes at a temperature of 0–10° C. in order to hydrolyze the lithium aluminum hydride-acid intermediate or complex.

Upon completion of this hydrolysis step, the ether solution suddenly became clear and some solid matter coagulated at the bottom of the flask. The ether was decanted and 250 parts of water were added to the solids, which completely dissolved. This aqueous solution was extracted with four portions of ether (70 parts each) and the extracts were combined with the decanted ether. The ether was then removed by distillation at atmospheric pressure and a temperature of 80° C. through a short helix-packed column. The residue was primarily trifluoroacetaldehydrol, 121.2 parts, and having a refractive index $n_D^{20}=1.3339$. The refractive index given in the literature is $n_D^{20}=1.3404$.

Example 2

Following the procedure of Example 1 above, 21.5 parts (0.565 mole) of lithium aluminum hydride, dissolved in 525 parts of diethyl ether, were slowly added to 114 parts (1 mole) of trifluoroacetic acid, dissolved in 708 parts of anhydrous diethyl ether, over a period of 1 hour and 40 minutes at a temperature in the range of −1 to 2° C. The reaction mixture was then agitated for 1 hour at a temperature of −5° C. and hydrolyzed at a temperature in the range of 0° C. to 5° C. with 40 parts of water, over a period of 20 minutes, and a mixture of 114.7 parts of concentrated sulfuric acid and 200 parts of water over a period of 40 minutes. At the completion of the hydrolysis step, the ether was decanted and the solid matter was dissolved in 300 parts of water and extracted four times with 125 part portions of ether.

Removal of the ether by distillation at a temperature of 85° C. produced a residue of crude trifluoroacetaldehydrol, 110 parts, and having a refractive index $n_D^{20}=1.3323$.

Example 3

6.5 parts of phosphoric anhydride and 55 parts of concentrated sulfuric acid were placed in a flask equipped with a dropping funnel, an agitator, a thermometer and a water-cooled condenser, followed by a solid carbon dioxide-acetone cooled cold trap protected by a drying tube. The flask was heated to a temperature of 85° C. and, while constantly agitating the contents of the flask, 15 parts of crude trifluoroacetaldehydrol (refractive index $n_D^{20}=1.3338$) were dropped into the mixture over a period of 3 minutes, and the flask was then heated to a temperature of 125° C. The colorless vapor evolved was collected in the cold trap. The yield was 7.6 parts of the desired trifluoroacetaldehyde.

Example 4

Following the procedure of Example 3 above, 50 parts of the crude trifluoroacetaldehydrol obtained as a product of the reaction of Example 2 above, were dehydrated and 34.5 parts of 2,2,2-trifluoroacetaldehyde were obtained, representing an overall yield of the aldehyde of 77.5%.

Example 5

Following the procedure of Example 1 above, a mixture of 11 parts of lithium aluminum hydride and 266 parts of anhydrous diethyl ether was slowly added to a mixture of 82 parts of perfluoropropionic acid and 354 parts of anhydrous diethyl at a temperature of −5 to 0° C. over a period of 1 hour and 10 minutes. The mixture was then stirred for 0.5 hour and hydrolyzed with water and sulfuric acid at a temperature of −3 to +5° C. Removal of the ether solvent after extraction of the reaction mixture produced a crude aldehydrol which was dehydrated with a mixture of $P_2O_5$ and sulfuric acid to produce perfluoropropionaldehyde in a yield of 60.1%.

Example 6

Following the procedure of Example 1 above, a mixture of 11 parts of lithium aluminum hydride and 266 parts of anhydrous diethyl ether was added to a mixture of 112 parts of perfluorobutyric acid and 354 parts of anhydrous diethyl ether. The complex was hydrolyzed and extracted as before, and the perfluorobutyraldehydrol produced was dehydrated as before to produce perfluorobutyraldehyde in a yield of 64%.

The term "perfluoroalkyl," as used herein, denotes the fluoroalkyl group of the structure $C_nF_{2n+1}$.

It will be obvious to those skilled in the art that many modifications may be made within the scope of the present invention without departing from the spirit thereof and the invention includes all such modifications.

We claim:

1. In a process for preparing an aldehydrol having the structure $$R_FCH(OH)_2$$

in which $R_F$ is a perfluoroalkyl group having about 1 to 17 carbon atoms, by reduction of an acid having the structure $R_FCOOH$ in which $R_F$ is as defined above, the improvement that comprises slowly adding approximately a stoichiometric amount of lithium aluminum hydride to the acid, with agitation, employing as reaction medium a solvent which is non-reactive with lithium aluminum hydride and in which lithium aluminum hydride is soluble at the temperature of reaction.

2. In the process for preparing an aldehyde having the structure $R_FCHO$ in which $R_F$ is a perfluoroalkyl group having about 1 to 17 carbon atoms by reduction of an acid having the structure $R_FCOOH$ in which $R_F$ is as defined above, the improvement that comprises slowly adding an approximately stoichiometric amount of lithium aluminum hydride to the acid with agitation, employing as reaction medium a solvent which is non-reactive with lithium aluminum hydride and in which lithium aluminum hydride is soluble at the temperature of reaction, thereafter hydrolyzing the reaction product by treatment with water, and thereafter dehydrating the resulting aldehydrol by treatment with a drying agent.

3. The process of claim 1 in which the acid is trifluoroacetic acid, the aldehydrol is trifluoroacetaldehydrol, and the solvent for both reactants is diethyl ether.

4. The process of claim 1 in which the acid is perfluoropropionic acid, the aldehydrol is perfluoropropionaldehydrol, and the solvent for both reactants is diethyl ether.

5. The process of claim 1 in which the acid is perfluorobutyric acid, the aldehydrol is perfluorobutyraldehydrol, and the solvent for both reactants is diethyl ether.

6. The process of claim 2 in which the drying agent for the last step is a mixture of phosphorus pentoxide and sulfuric acid.

(References on following page)

References Cited in the file of this patent

UNITED STATES PATENTS

| | | |
|---|---|---|
| 2,568,500 | Husted et al. | Sept. 18, 1951 |
| 2,666,797 | Husted et al. | Jan. 19, 1954 |

OTHER REFERENCES

Nystrom et al.: "Reduction of Organic Compounds, etc." (October 1947); J. Am. Chem. Soc., vol. 69, page 2548.

Hochstein et al.: "Addition of $LiAlH_4$ to Double Bonds" (October 1948), J. Am. Chem. Soc., vol. 70, p. 3485.

Gaylord: "Reduction With Complex Metal Hydrides," Interscience, N. Y., 1956, pp. 1017–22.